1,496,926

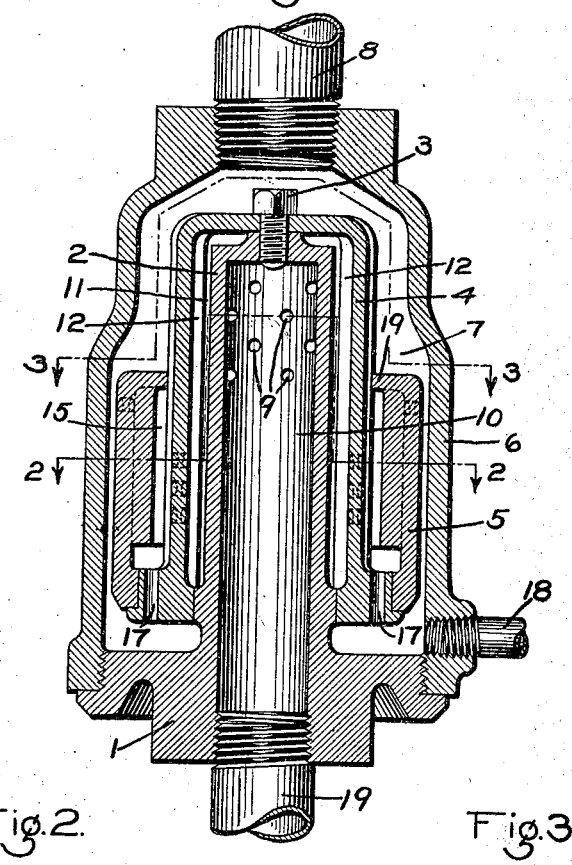
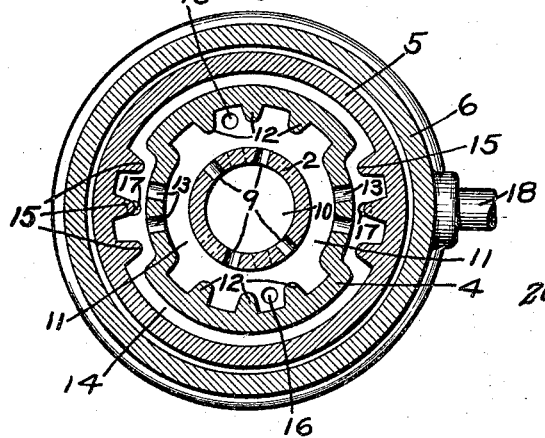
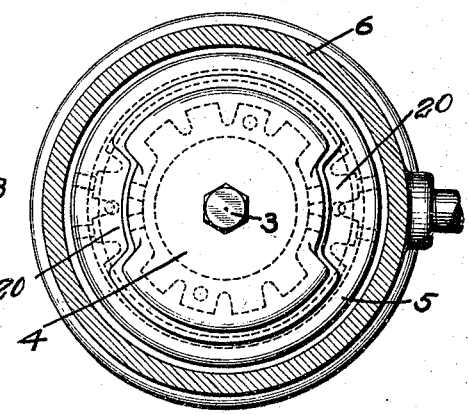
June 10, 1924.  A. ENGLAND  1,496,926
OIL SEPARATOR
Filed Sept. 19, 1921
INVENTOR
ALEXANDER ENGLAND
ATTORNEY Patented June 10, 1924.

UNITED STATES PATENT OFFICE.

ALEXANDER ENGLAND, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

OIL SEPARATOR.

Application filed September 19, 1921. Serial No. 501,756.

*To all whom it may concern:*

Be it known that I, ALEXANDER ENGLAND, a citizen of the United States, residing at Wilkinsburg, in the county of Allegheny and State of Pennsylvania, have invented new and useful Improvements in Oil Separators, of which the following is a specification.

This invention relates to oil separators more particularly adapted for separating oil contained in the air compressed by a compressor.

The principal object of the invention is to provide an efficient, compact, and inexpensive oil separator of the above character.

In the accompanying drawing; Fig. 1 is a central vertical section of an oil separator constructed in accordance with my invention; Fig. 2 a section on the line 2—2 of Fig. 1; and Fig. 3 a section on the line 3—3 of Fig. 1.

As shown in the drawing, the oil separator may comprise a base member 1 having a central vertical tubular portion 2 with the upper end closed. Secured by a bolt 3 to the closed end wall of the portion 2 is an inverted cylinder 4, and mounted on the base portion of the cylinder 4 is a cylinder 5. A cap 6 having screw-threaded engagement with the base member 1 encloses the above mentioned parts and forms a chamber 7 connected to a vertical outlet pipe 8.

Near the upper end, the tubular portion 2 is provided with a number of apertures or openings 9, connecting the central chamber 10 with the annular chamber 11 intermediate the tubular portion 2 and the inverted cylinder 4 and opposite the apertures 9, the inverted cylinder 4 is provided with a series of vertical ribs 12. The inverted cylinder 4 is provided near the lower end with oppositely disposed apertures 13, connecting the chamber 11 with chamber 14 intermediate the inverted cylinder 4 and the cylinder 5, and opposite the apertures 13, the cylinder 5 is provided with vertically disposed ribs 15.

The portions of the inverted cylinder 4 having the apertures 13 is depressed and the ribs 15 extend into the depressions, so that a tortuous passage is provided for the flow of air. Drain holes 16 are provided at the base of the chamber 11 to permit oil to drain from chamber 11 to the chamber 7 and drain holes 17 are provided at the base of chamber 14 for the same purpose.

The lower portion of the cap 6 may be tapped for a pipe 18, so that oil collected at the bottom of chamber 7 may be drained off into a suitable reservoir or other receptacle.

In operation, fluid compressed by the compressor flows from the inlet pipe 19 into the central chamber 10 of the oil separator and thence through the holes 9 to the chamber 11. I have found that in passing through small apertures such as the apertures 9, there is a tendency for any oil in the air to be condensed into larger and heavier particles and as the air issues from the apertures, it expands in the chamber 11 and the heavy particles of oil are precipitated against the ribs 12 and oil so precipitated drains down by gravity to the bottom of the chamber, where the oil passes through the drain holes 16 to the chamber 7.

The air passing through the apertures 9 into chamber 11 flows around in said chamber, approximately 90° to the apertures 13 in the inverted cylinder 4 and a further condensation of any oil remaining in suspension takes place as the air passes through the apertures 13 to the chamber 14. This oil is then deposited on the ribs 15 and drains down the ribs by gravity, passing through the drain holes 17 to the chamber 7.

Air passing into the chamber 14 flows through the tortuous passages formed by the projection of the ribs 15 into the depressions of the inverted cylinder 4 and is practically prevented from flowing vertically upward by flanges 20, which extend over the tops of the ribs 15 into the depressions formed in the cylinder 4. Air then flows from chamber 7 to the outlet pipe 8.

By reason of the more or less horizontal flow of air in the chambers 11 and 14, the oil deposited on the ribs 12 and 15 is prevented from being carried along with the air by the rib construction which tends to shield the oil from the effect of the current of air.

However, while most of the air flows as indicated above, some air will also flow out through the drain holes 16 and 17 and this flow of air tends to assist the flow of oil downwardly along the ribs to the drain holes.

Oil which collects at the bottom of the chamber 7 flows out through pipe 18 into the drain reservoir or receptacle.

Having now described my invention, what

I claim as new and desire to secure by Letters Patent, is:—

1. An oil separator comprising a member having a fluid under pressure inlet chamber and having a closed end with outlet ports for said chamber only adjacent to said end, a member enclosing the first member and having ribs against which fluid passing through said ports impinges and having outlet ports only at points remote from the first mentioned ports, and a third member enclosing the second member and having ribs against which fluid passing through said remote ports impinges.

2. An oil separator comprising a member having a fluid under pressure inlet chamber and having a closed end with outlet ports for said chamber only adjacent to said end, a member enclosing the first member and having ribs against which fluid passing through said ports impinges and having outlet ports only at points remote from the first mentioned ports, and a third member enclosing the second member and having ribs against which fluid passing through said remote ports impinges, said third member having a baffle flange at one end for diverting the flow of fluid from the space between the second and the third members.

In testimony whereof I have hereunto set my hand.

ALEXANDER ENGLAND.